United States Patent
Teng (10) Patent No.: US 8,018,549 B2
(45) Date of Patent: Sep. 13, 2011

(54) LIQUID CRYSTAL DISPLAY HAVING PLASTIC FRAME ROTATABLE WITH LOWER TRAY

(75) Inventor: Hsuan-Yu Teng, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 722 days.

(21) Appl. No.: 12/150,262

(22) Filed: Apr. 25, 2008

(65) Prior Publication Data

US 2008/0266484 A1   Oct. 30, 2008

(30) Foreign Application Priority Data

Apr. 25, 2007   (CN) .......................... 2007 1 0074213

(51) Int. Cl.
   *G02F 1/1333*   (2006.01)
(52) U.S. Cl. ............ 349/58; 349/65; 362/97.2; 362/633
(58) Field of Classification Search .................... 349/58, 349/65, 62, 64, 67; 362/632–634, 614, 97.2
   See application file for complete search history.

(56) References Cited

U.S. PATENT DOCUMENTS

| | | | |
|---|---|---|---|
| 6,847,417 B2* | 1/2005 | Kim | 349/58 |
| 7,125,157 B2 | 10/2006 | Fu et al. | |
| 7,178,967 B2* | 2/2007 | Kim | 362/633 |
| 2006/0152921 A1* | 7/2006 | Welker | 362/147 |

FOREIGN PATENT DOCUMENTS

| | | |
|---|---|---|
| CN | 1549021 A | 11/2004 |
| CN | 1881027 A | 12/2006 |
| KR | 10-2004-0005188 A | 1/2004 |
| TW | 200530697 A | 9/2005 |
| TW | I254173 B | 5/2006 |

\* cited by examiner

*Primary Examiner* — Thoi Duong
(74) *Attorney, Agent, or Firm* — Altis Law Group, Inc.

(57) ABSTRACT

A liquid crystal display includes a lower tray, a plastic frame, and a plurality of lamps. The lower tray includes a bottom plate and two side plates opposite to each other. The side plates are perpendicularly connected with the bottom plate. The plastic frame includes a first wall, a second wall, and two opposite third walls. The first wall, the second wall and the third walls are connected end to end, and the first wall is opposite to the second wall. The plastic frame and the bottom plate of the lower tray form a first accommodating space. The lamps are placed in the first accommodating space. The first wall of the plastic frame and the side plates of the lower tray form a hinge device to make the plastic frame and the lower tray fixed and rotatable.

20 Claims, 6 Drawing Sheets

LIQUID CRYSTAL DISPLAY HAVING PLASTIC FRAME ROTATABLE WITH LOWER TRAY

FIELD OF THE INVENTION

The present invention relates to a liquid crystal display, and particularly to a liquid crystal display having a plastic frame and a lower tray, the plastic frame being rotatably attached to the lower tray.

BACKGROUND OF THE INVENTION

A typical LCD has the advantages of portability, low power consumption, and low radiation, and has been widely used in various portable information products such as notebooks, personal digital assistants (PDAs), video cameras and the like.

Figure 7:
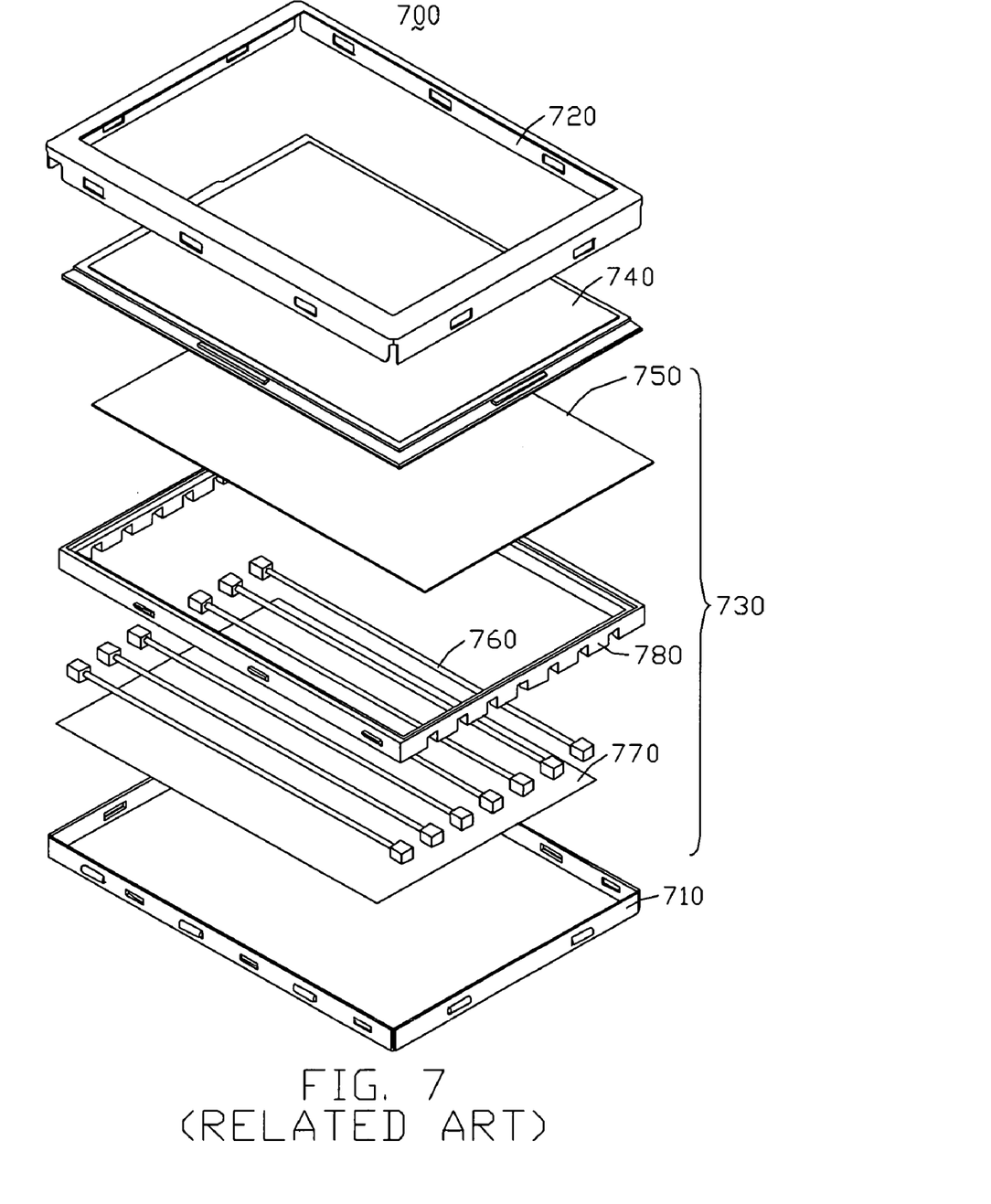
FIG. 7 is an exploded, isometric view of a conventional liquid crystal display.

Referring to FIG. 7, a typical liquid crystal display 700 includes an upper frame 720, a liquid crystal panel 740, a backlight module 730, and a lower tray 710. The upper frame 720 and the lower tray 710 cooperatively form a space to accommodate the liquid crystal panel 740 and the backlight module 730. The backlight module 730 is disposed below the liquid crystal panel 740, and provides uniform planar light to the liquid crystal panel 740.

The backlight module 730 includes a plurality of linear lamps 760, an optical film assembly 750, a reflective film 770, and a plastic frame 780. The optical film assembly 750 includes a light guide plate (not shown), a light diffusing film (not shown), and a bright enhancement film (BEF) (not shown) arranged in that order from bottom to top. The optical film assembly 750 is received in a top region of the plastic frame 780, and is supported on an inner ledge of the plastic frame 780. The lamps 760 are located below the light guide plate, and are fixed in position by engagement with the plastic frame 780. Thus the lamps 760 are kept apart from the optical film assembly 750 by the plastic frame 780. The reflective film 770 is received in the lower tray 710, and is located below the lamps 760.

The upper frame 720 has a plurality of openings (not labeled). The plastic frame 780 has a plurality of catches (not labeled). The lower tray 710 has a plurality of openings (not labeled) and a plurality of catches (not labeled). In assembly of the liquid crystal display 700, the catches of the plastic frame 780 are snappingly engaged in the openings of the lower tray 710. Thereby, the plastic frame 780 is attached to the lower tray 710. Then the catches of the lower tray 710 are snappingly engaged in the openings of the upper frame 720. Thereby, the upper frame 720 is attached to the lower tray 710. Thus, the liquid crystal display 700 is assembled. Further or alternatively, a plurality of screws (not shown) may be used to attach the upper frame 720 to the lower tray 710.

The lamps 760 are typically cold cathode fluorescent lamps (CCFLs). The lamps 760 are long and somewhat fragile, and are liable to break or become defective. When the lamps 760 need to be repaired or replaced, the catches of the lower tray 710 need to be released from the openings of the upper frame 720, so that the upper frame 720 can be removed. Then the liquid crystal panel 740 and the optical film assembly 750 need to be removed. Then the catches of the plastic frame 780 need to be released from the openings of the lower tray 710, so that the plastic frame 780 can be removed. It is only then that the faulty lamps 760 can be taken out. Further or alternatively, the screws (not shown) need to be removed in order to detach the upper frame 720 from the lower tray 710. Thus, the operation of disassembly of the liquid crystal display 740 is complicated and time-consuming.

What is needed, therefore, is a liquid crystal display that can overcome the above-described deficiencies.

SUMMARY

In one preferred embodiment, a liquid crystal display includes a lower tray, a plastic frame, and a plurality of lamps. The lower tray includes a bottom plate and two side plates opposite to each other. The side plates are perpendicularly connected with the bottom plate. The plastic frame includes a first wall, a second wall, and two opposite third walls. The first wall, the second wall and the third walls are connected end to end, and the first wall is opposite to the second wall. The plastic frame and the bottom plate of the lower tray form a first accommodating space. The lamps are placed in the first accommodating space. The first wall of the plastic frame and the side plates of the lower tray form a hinge device to make the plastic frame and the lower tray fixed and rotatable.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
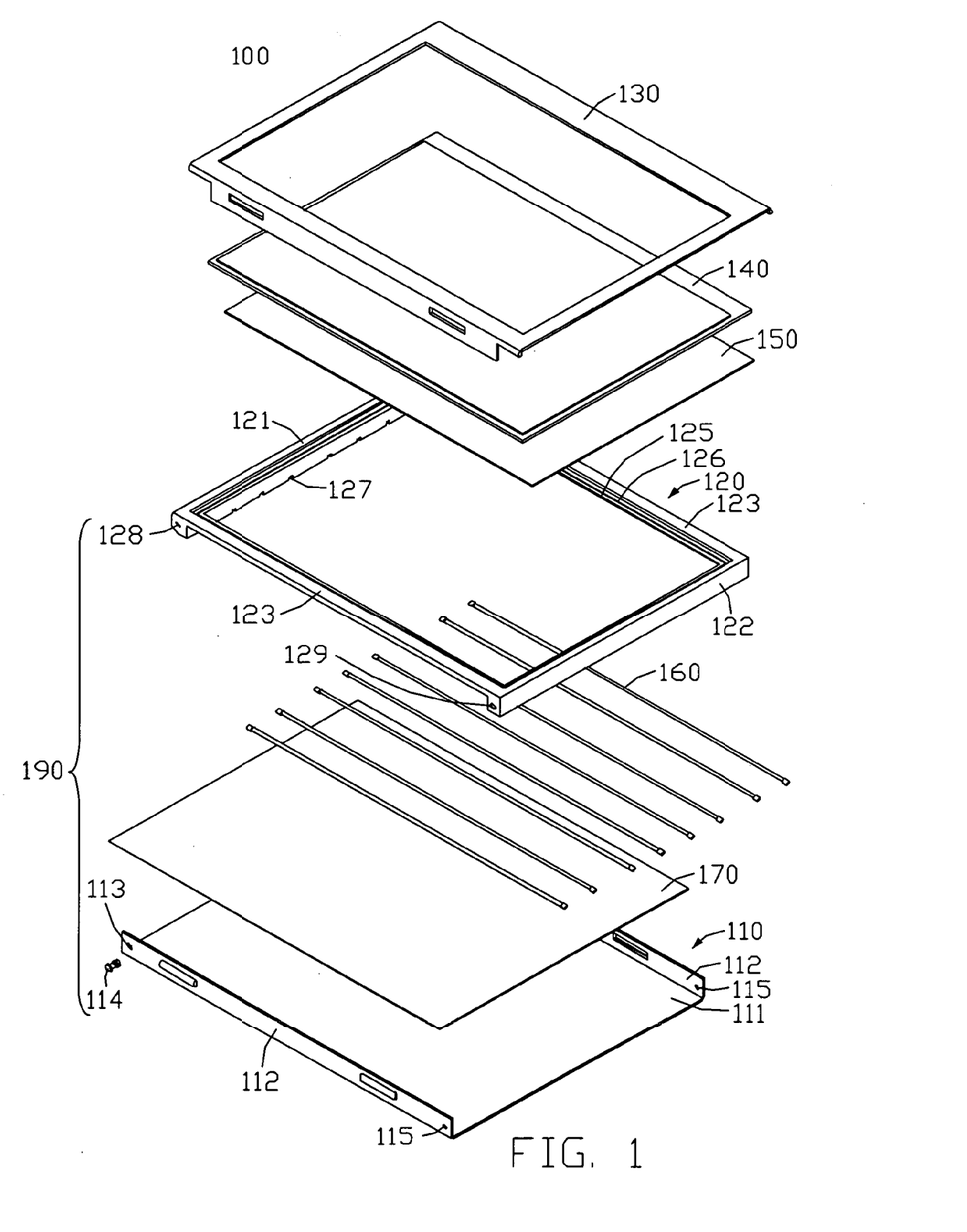
FIG. 1 is an exploded, isometric view of a liquid crystal display device according to a first embodiment of the present invention, the liquid crystal display including a plastic frame, a plurality of lamps, a reflective film, and a lower tray.

Referring to FIG. 1, a liquid crystal display 100 according to a first embodiment of the present invention is shown. The liquid crystal display 100 includes an upper frame 130, a plastic frame 120, a lower tray 110, a liquid crystal panel 140, an optical film assembly 150, a plurality of linear lamps 160, and a reflective film 170.

Each lamp 160 has two rubber caps (not labeled) engaged around two ends thereof respectively. The optical film assembly 150 includes a light guide plate (not shown), a diffusing film (not shown), and a bright enhancement film (not shown) arranged in that order from bottom to top. The upper frame 130 and the lower tray 110 cooperatively form an upper accommodating space and a lower accommodating space.

The plastic frame 120 includes a first wall 121, a second wall 122 opposite the first wall 121, and two opposite third walls 123. The first wall 121, the second wall 122, and the third walls 123 are connected end to end. Inner surfaces of the plastic frame 120 define a first step structure 125, and a second step structure 126 above the first step structure 125. Each of the first step structure 125 and the second step structure 126 includes a horizontal surface (not labeled) and a vertical surface (not labeled). A height of the first step structure 125 is substantially equal to a thickness of the optical film assembly 150.

An outer surface of the first wall 121 is arc-shaped and smooth. Bottom portions of the first wall 121 and the second wall 122 define a plurality of notches 127. The notches 127 are configured for interferingly receiving the rubber caps of the lamps 160, thus fixing the lamps 160 in position in the plastic frame 120. Two ends of the first wall 121 where the first wall 121 joins the third walls 123 define two screw holes 128 with female threads (not labeled), respectively. The screw holes 128 are aligned with each other. Two ends of the second wall 122 where the second wall 122 joins the third walls 123 include two latching protrusions 129, respectively.

The lower tray 110 includes a bottom plate 111 and two side plates 112 perpendicularly connected with the bottom plate 111. The side plates 112 are opposite to each other. Each side plate 112 defines a through hole 113 and a latching hole 115 therein. The through holes 113 of the side plates 112 correspond to the screw holes 128 of the plastic frame 120. The latching holes 115 of the side plates 112 correspond to the latching protrusions 129 of the plastic frame 120. The lower tray 110 also includes two screws 114 corresponding to the screw holes 128 of the plastic frame 120 and the through holes 113 of the lower tray 110. The screw holes 128 of the plastic frame 120, the corresponding through holes 113 of the lower tray 110, and the screws 114 cooperatively form a hinge device 190. The latching protrusions 129 of the plastic frame 120 and the latching holes 115 of the lower tray 110 cooperatively form a latching device (not labeled).

Figure 2:
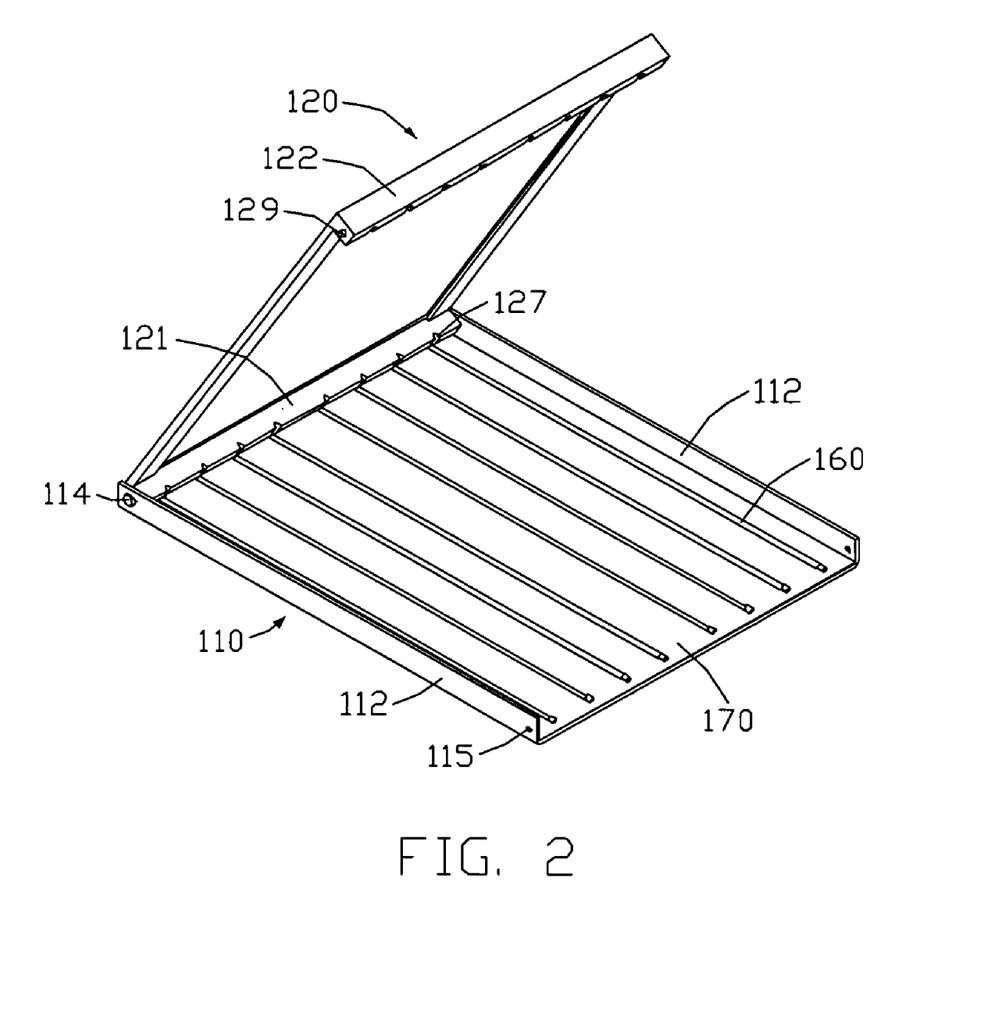
FIG. 2 is a partly assembled view of the plastic frame, the lamps, the reflective film and the lower tray of FIG. 1, showing the plastic frame hinged to the lower tray.

Referring also to FIG. 2, when the plastic frame 120 and the lower tray 110 are attached together, the screw holes 128 of the plastic frame 120 are aligned with the through holes 113 of the lower tray 110, and the screws 114 are inserted through the through holes 113 and engaged in the screw holes 128. Thus one end of the plastic frame 120 and one end of the lower tray 110 are hingedly attached to each other. Because the outer surface of the first wall 121 is smooth and arc-shaped, the plastic frame 120 is rotatable relative to the lower tray 110 about the hinge device 190.

The reflective film 170 is disposed on the bottom plate 111 of the lower tray 110, and the lamps 160 are disposed on the reflective film 170. One end of each lamp 160 with the rubber cap is inserted into the corresponding notch 127 of the first wall 121 of the plastic frame 120. The plastic frame 120 is rotated with the lower tray 110, and the other end of each lamp 160 with the rubber cap is inserted into the corresponding notch 127 of the second wall 122 of the plastic frame 120. Then the latching protrusions 129 on the second wall 122 of the plastic frame 120 are inserted into the latching holes 115 of the lower tray 110, respectively. Thus, the reflective film 170, the lamps 160, the plastic frame 120 and the lower tray 110 are assembled together.

Figure 3:
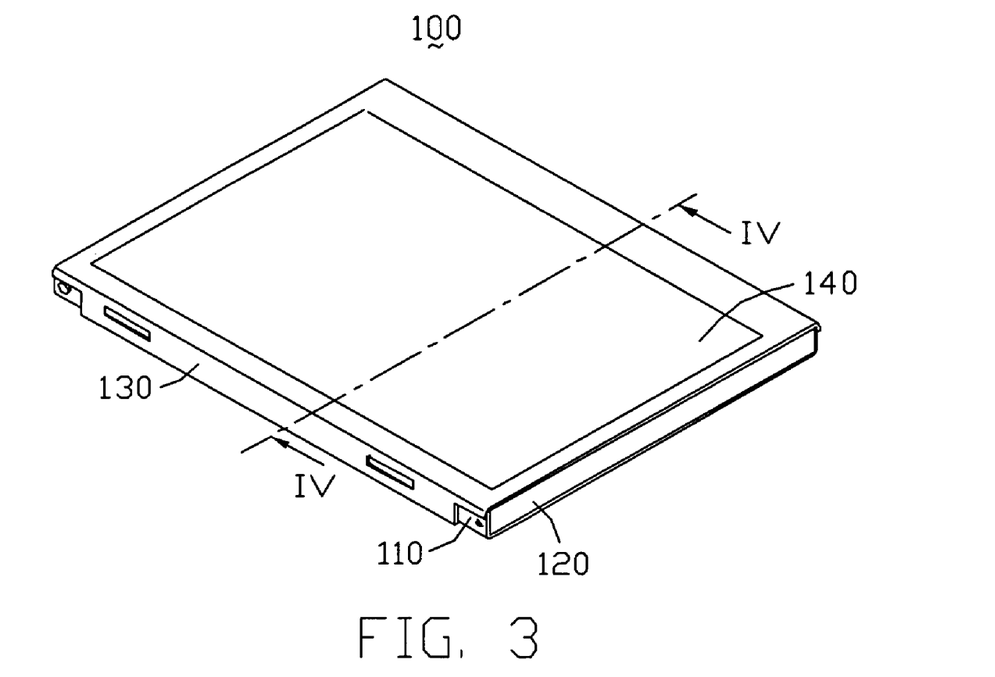
FIG. 3 is an assembled view of the liquid crystal display of FIG. 1.
Figure 4:
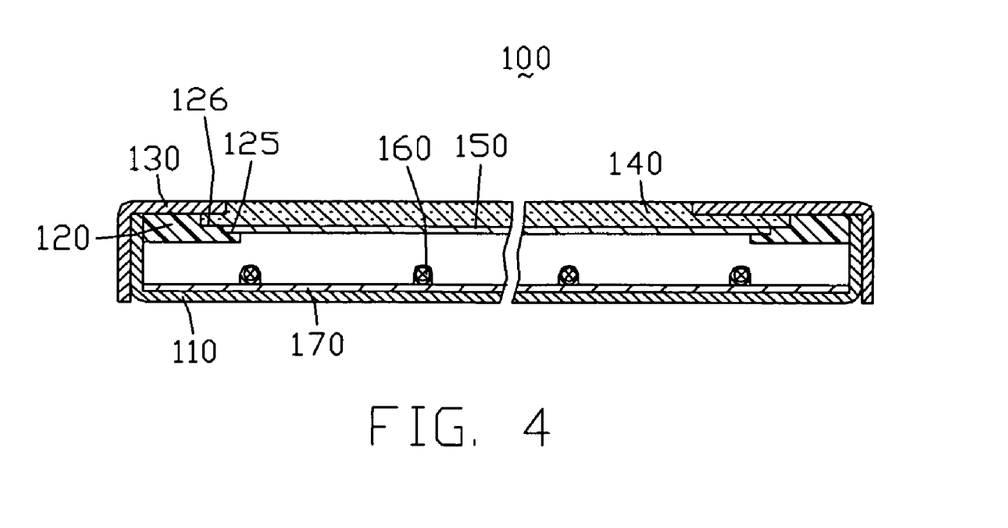
FIG. 4 is an enlarged, abbreviated, cross-sectional view of the liquid crystal display taken along line IV-IV of FIG. 3.

Referring also to FIG. 3 and FIG. 4, when the liquid crystal display 100 is assembled, the plastic frame 120 is fixed with the lower tray 110, the optical film assembly 150 is placed on the first step structure 125 of the plastic frame 120. The optical film assembly 150 abuts the horizontal surface and the vertical surface of the first step structure 125. The liquid crystal panel 140 is placed on the second step structure 126 of the plastic frame 120, and the liquid crystal panel 140 abuts the horizontal surface and the vertical surface of the second step structure 126.

Then the upper frame 130 covers the plastic frame 120 and the lower tray 110, and is fixed with the lower tray 110 by fixing structures such as catches and corresponding openings (not labeled).

Thus the upper frame 130, the plastic frame 120 and the lower tray 110 are fixed together and form the two respective accommodating spaces. The bottom plate 111 of the lower tray 110 and the inner surfaces of the plastic frame 120 below the horizontal surface of the first step structure 125 form a first accommodating space (not labeled) accommodating the reflective film 170 and the lamps 160. The upper frame 130 and the inner surfaces of the plastic frame 120 above the horizontal surface of the first step structure 125 form a second accommodating space (not labeled) accommodating the optical film assembly 150 and the liquid crystal panel 140.

Unlike with conventional liquid crystal displays, the liquid crystal display 100 includes the hinge device 190. If the lamps 160 need be replaced, an operator just needs to remove the upper frame 130, unlatch the latching device, and rotate the plastic frame 120 up from the lower tray 110. Then the lamps 160 and the reflective film 170 in the first accommodating space are separated from the plastic frame 120, the optical film assembly 150 and the liquid crystal panel 140. Thus, the lamps 160 can be easily removed. A disassembly operation of the liquid crystal display 100 and a replacing operation of the lamps 160 are simplified.

Figure 5:
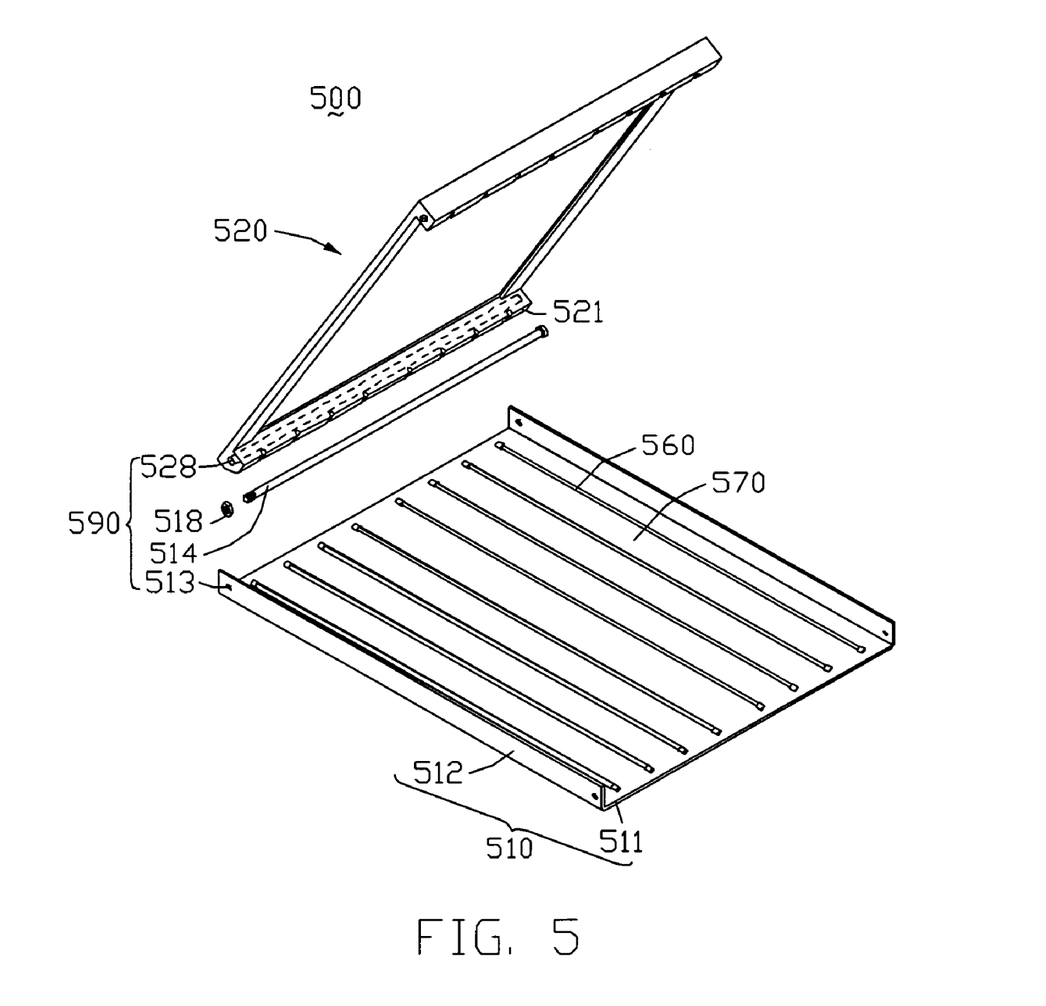
FIG. 5 is an exploded, isometric view of a liquid crystal display according to a second embodiment of the present invention.

Referring to FIG. 5, a liquid crystal display 500 according to a second embodiment of the present invention is shown. The liquid crystal display 500 is similar to the liquid crystal display 100 of the first embodiment. However, a first wall 521 of a plastic frame 520 defines a long first through hole 528. The liquid crystal display 500 further includes a long screw 514 and a nut 518. The screw 514 is a bit longer than the first through hole 528 of the plastic frame 520, and an end of the screw 514 has a plurality of male threads. The nut 518 has a plurality of female threads therein. Two side plates 512 of a lower tray 510 define two second through holes 513 corresponding to the first through hole 528. When the liquid crystal display 500 is assembled, the screw 514 is aligned with and inserted through one of the second through holes 513 and the first through hole 528. The end of the screw 514 extends out of the other second through hole 513 of the lower tray 510, and the nut 518 is driven into the screw 514. The screw 514, the nut 518, the first through hole 528, and the second through holes 513 form a hinge device 590, so that a reflective film 570 and a plurality of lamps 560 placed on a bottom plate 511 of the lower tray 510 can be separated from the plastic frame 520 by rotating the plastic frame 520 along the hinge device 590. Therefore, the lamps 560 can easily be replaced.

Figure 6:
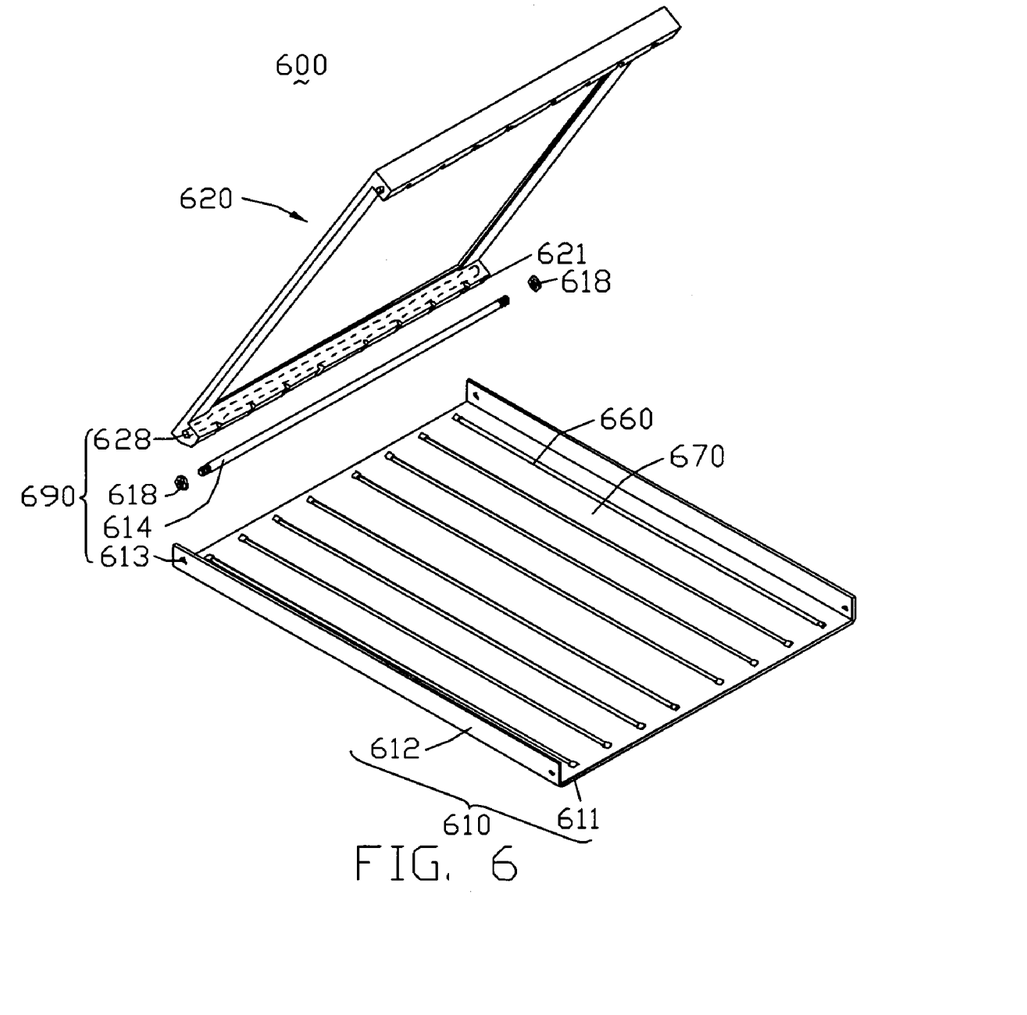
FIG. 6 is an exploded, isometric view of a liquid crystal display according to a third embodiment of the present invention.

Referring to FIG. 6, a liquid crystal display 600 according to a third embodiment of the present invention is shown. The liquid crystal display 600 is similar to the liquid crystal display 500 of the second embodiment. A first wall 621 of the plastic frame 620 defines a first through hole 628. However, the liquid crystal display 600 further includes a rotation axle 614 and two nuts 618. The rotation axle 614 is a bit longer than the first through hole 628. Two ends of the rotation axle 614 have a plurality of male threads (not labeled). The nuts 618 have female threads (not labeled) corresponding to the male threads of the rotation axle 614. Two side plates 612 of a lower tray 610 define two through holes 613 corresponding to the first through hole 628. When the liquid crystal display 600 is assembled, the rotation axle 614 is aligned with and inserted through the second through holes 613 and the first through hole 628. The ends of the rotation axle 614 extend out of the second through holes 613 of the lower tray 610, respectively. The nuts 618 are driven into the ends of the rotation axle 614. The rotation axle 614, the nuts 618, the first through hole 628, and the second through holes 613 form a hinge device 690, so that a reflective film 670 and a plurality of lamps 660 placed on a bottom plate 611 of the lower tray 610 can be separated from the plastic frame 620 by rotating the plastic frame 620 along the hinge device 690. Therefore, the lamps 660 can easily be replaced.

Further or alternative embodiments may include the following. In a first example, the first wall 121 of the plastic frame 120 defines two latching holes. The side plates 112 of the lower tray 110 define two screw holes correspondingly. A middle portion of the screw 114 has a plurality of screw threads. An end of the screw 114 is smooth. When the plastic frame 120 and the lower tray 110 are assembled, the screws 114 are driven through the screw holes of the lower tray 110, and ends of the screws 114 are inserted into the latching holes in the plastic frame 120. The screws 114, the latching holes, and the screw holes cooperatively form a hinge device.

In a second example, the first wall 121 has two column-shaped latching protrusions at two ends that are conjunct with the third walls 123, the side plates 112 of the lower tray 110 define two through holes. The latching protrusions have smooth outer surfaces, and the through holes have smooth inner surfaces. Therefore, the latching protrusions are rotatable in the through holes. The latching protrusions and the through holes cooperatively form a hinge device.

In a third example, the second wall 122 of the plastic frame 120 defines two screw holes, the side plate 112 of the lower tray 110 defines another two screw holes correspondingly. The liquid crystal display 100 further includes two more screws. The two more screws and the four screw holes form a fixing device to fix the second wall 122 of the plastic frame 120 with the lower tray 110.

In a fourth example, the fixing device of the liquid crystal display 100 can be hooks on the side plate 112 of the lower tray 110 and notches in the second wall 122 of the plastic frame 120.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of shape, size, and arrangement of parts) within the principles of the invention to the full extent indicated by the broad general meaning of the terms in which the appended claims are expressed.

What is claimed is:

1. A liquid crystal display comprising:
   a lower tray comprising a bottom plate and two side plates opposite to each other, the side plates being perpendicularly connected with the bottom plate;
   a plastic frame comprising a first wall and a second wall opposite to the first wall, the plastic frame and the bottom plate of the lower tray cooperatively forming a first accommodating space;
   a plurality of linear lamps arranged parallel to each other and held in the first accommodating space by the first and second walls of the plastic frame; and
   a hinge device hingedly connecting the plastic frame to the lower tray;
   wherein the first wall of the plastic frame comprises:
   two opposite ends respectively adjacent to the two side plates; and
   a smooth arc-shaped outer surface extending from one of the two ends of the first wall to the other of the two ends of the first wall and being adjacent to the bottom plate of the lower tray; and
   the smooth arc-shaped outer surface allows the plastic frame to be rotatable relative to the lower tray about the hinge device.

2. The liquid crystal display as claimed in claim 1, further comprising an upper frame, a liquid crystal panel, and an optical film assembly, the upper frame and the plastic frame forming a second accommodating space to accommodate the liquid crystal panel and the optical film assembly.

3. The liquid crystal display as claimed in claim 2, wherein the optical film assembly comprises a light guide plate, a light diffusing film, and a brightness enhancement film.

4. The liquid crystal display as claimed in claim 2, wherein inner surfaces of the plastic frame include a first step structure and a second step structure, each step structure comprising a horizontal surface and a vertical surface.

5. The liquid crystal display as claimed in claim 4, wherein the upper frame and inner surfaces of the plastic frame above the horizontal surface of the first step structure form the first accommodating space accommodating the optical film assembly and the liquid crystal panel.

6. The liquid crystal display as claimed in claim 5, wherein the optical film assembly is placed in the first step structure, the optical film assembly abutting the first step structure, a height of the first step structure being substantially equal to a thickness of the optical film assembly.

7. The liquid crystal display as claimed in claim 6, wherein the liquid crystal panel is placed in the second step structure, the liquid crystal panel abutting the second step structure.

8. The liquid crystal display as claimed in claim 7, wherein the hinge device comprises a first through hole in the first wall, and two second through holes in the side plates of the lower tray corresponding to the first through hole, the first through hole and the second through holes having a same axis of rotation.

9. The liquid crystal display as claimed in claim 8, wherein the hinge device further comprises a screw slightly longer than the first through hole, and a nut, the screw being inserted through the first through hole and the second through holes and being engaged with the nut.

10. The liquid crystal display as claimed in claim 8, wherein the hinge device further comprises a rotation axle and two nuts, the rotation axle being inserted through the first through hole and the second through holes with the nuts engaged at the ends thereof.

11. The liquid crystal display as claimed in claim 7, wherein the hinge device comprises two screw holes in the first wall, and two through holes in the side plates of the lower tray respectively corresponding to the screw holes, the through holes and the screw holes having a same axis of rotation.

12. The liquid crystal display as claimed in claim 11, wherein the hinge device further comprises two screws, ends of the screws having male threads, the screws being inserted through the through holes and being driven into the screw holes, respectively.

13. The liquid crystal display as claimed in claim 7, wherein the hinge device comprises two latching holes in the first wall, and two screw holes in the side plates of the lower tray respectively corresponding to the latching holes, the latching holes and the screw holes having a same axis of rotation.

14. The liquid crystal display as claimed in claim 13, wherein the hinge device further comprises two screws, middle portions of the screws having male threads, the screws being driven through the screw holes of the side plates of the lower tray and being inserted into the latching holes of the plastic frame, respectively.

15. The liquid crystal display as claimed in claim 7, wherein the hinge device comprises two column-shaped latching protrusions with smooth surfaces in the first wall, with the latching protrusions having a same axis of rotation, and further comprises two latching holes in the lower tray respectively corresponding to the latching protrusions, the latching protrusions being inserted into the latching holes, respectively.

16. The liquid crystal display as claimed in claim 7, wherein the side plates of the lower tray define two latching holes, respectively, and two ends of the second wall of the plastic frame comprise two latching protrusions inserted into the latching holes, respectively.

17. The liquid crystal display as claimed in claim 4, wherein the lower tray and inner surfaces of the plastic frame below the horizontal surface of the first step structure form the second accommodating space accommodating the lamps.

18. A liquid crystal display comprising:
    a lower tray comprising a bottom plate and two side plates opposite to each other, the side plates being perpendicularly connected with the bottom plate;
    a plastic frame comprising a first wall and a second wall opposite to the first wall, the plastic frame and the bottom plate of the lower tray cooperatively forming a first accommodating space surrounded by the two side plates of the lower tray and the first and the second walls of the plastic frame;
    a plurality of linear lamps arranged parallel to each other and held in the first accommodating space by the first and second walls of the plastic frame; and
    a hinge device hingedly connecting the plastic frame to the lower tray;
    wherein the hinge device comprises a first through hole inside the first wall oriented along an extending direction of a long side of the first wall, and two second through holes respectively in the two side plates of the lower tray, the two second through holes respectively corresponding to two ends of the first through hole and having a same axis of rotation as the first through hole.

19. The liquid crystal display as claimed in claim 18, wherein the first wall of the plastic frame comprises:
    two opposite ends respectively adjacent to the two side plates; and
    a smooth arc-shaped outer surface extending from one of the two ends of the first wall to the other of the two ends of the first wall and being adjacent to the bottom plate of the lower tray; and
    the smooth arc-shaped outer surface allows the plastic frame to be rotatable relative to the lower tray about the hinge device.

20. The liquid crystal display as claimed in claim 19, wherein the hinge device further comprises a rotation axle and two nuts, the rotation axle being inserted through the first through hole and the second through holes with the nuts engaged at the ends of the rotation axle.

\* \* \* \* \*